US008914751B2

United States Patent
Bi et al.

(10) Patent No.: US 8,914,751 B2
(45) Date of Patent: Dec. 16, 2014

(54) CHARACTER DELETION DURING KEYBOARD GESTURE

(71) Applicant: Google Inc., Mountain View, CA (US)

(72) Inventors: Xiaojun Bi, Sunnyvale, CA (US); Kurt Edward Partridge, Palo Alto, CA (US); Yu Ouyang, San Jose, CA (US); Shumin Zhai, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/740,946

(22) Filed: Jan. 14, 2013

(65) Prior Publication Data

US 2014/0108989 A1 Apr. 17, 2014

Related U.S. Application Data

(60) Provisional application No. 61/714,672, filed on Oct. 16, 2012.

(51) Int. Cl.
*G06F 3/033* (2013.01)
*G06F 3/048* (2013.01)
*G06F 3/0484* (2013.01)
*G06F 3/0488* (2013.01)

(52) U.S. Cl.
CPC .......... *G06F 3/0484* (2013.01); *G06F 3/04886* (2013.01)
USPC .......................................... 715/863; 715/773

(58) Field of Classification Search
USPC ................................................. 715/773, 863
See application file for complete search history.

(56) References Cited

U.S. PATENT DOCUMENTS

| | | | |
|---|---|---|---|
| 5,303,312 A * | 4/1994 | Comerford et al. | 382/189 |
| 6,286,064 B1 | 9/2001 | King et al. | |
| 6,292,179 B1 | 9/2001 | Lee | |
| 6,801,190 B1 | 10/2004 | Robinson et al. | |
| 7,030,863 B2 | 4/2006 | Longe et al. | |
| 7,042,443 B2 | 5/2006 | Woodard et al. | |
| 7,075,520 B2 | 7/2006 | Williams | |
| 7,088,345 B2 | 8/2006 | Robinson et al. | |

(Continued)

FOREIGN PATENT DOCUMENTS

WO 2011113057 A1 9/2011

OTHER PUBLICATIONS

"Android FAQ," Retrieved from http://www.8pen.com/faq, accessed on Jul. 30, 2012, 5 pp.

(Continued)

*Primary Examiner* — Kieu Vu
*Assistant Examiner* — Aaron Lowenberger
(74) *Attorney, Agent, or Firm* — Shumaker & Sieffert, P.A.

(57) ABSTRACT

Techniques are described for character deletion on a computing device that utilizes a gesture-based keyboard. The computing device includes a processor and at least one module operable by the processor to output, for display at a presence-sensitive display, a graphical keyboard comprising a plurality of keys and a text editor field. In response to receiving an indication of a gesture that comprises a first path, the module outputs a first character, based at least in part on the first path, associated with a first key and a second character associated with a second key. In response to determining that the gesture further comprises a second path that retraces at least a portion of the first path, the module removes the second character from the text editor field of the presence-sensitive display.

19 Claims, 5 Drawing Sheets

(56) References Cited

U.S. PATENT DOCUMENTS

| | | |
|---|---|---|
| 7,098,896 B2 | 8/2006 | Kushler et al. |
| 7,145,554 B2 | 12/2006 | Bachmann |
| 7,151,530 B2 | 12/2006 | Roeber et al. |
| 7,199,786 B2 | 4/2007 | Suraqui |
| 7,250,938 B2 | 7/2007 | Kirkland et al. |
| 7,251,367 B2 | 7/2007 | Zhai |
| 7,277,088 B2 | 10/2007 | Robinson et al. |
| 7,453,439 B1 | 11/2008 | Kushler et al. |
| 7,508,324 B2 | 3/2009 | Suraqui |
| 7,609,278 B1* | 10/2009 | Dash .......................... 345/619 |
| 7,706,616 B2 | 4/2010 | Kristensson et al. |
| 7,716,579 B2 | 5/2010 | Gunn et al. |
| 7,750,891 B2 | 7/2010 | Stephanick et al. |
| 7,921,361 B2 | 4/2011 | Gunn et al. |
| 8,036,878 B2 | 10/2011 | Assadollahi |
| 8,135,582 B2 | 3/2012 | Suraqui |
| 2004/0140956 A1* | 7/2004 | Kushler et al. ............... 345/168 |
| 2005/0146508 A1* | 7/2005 | Kirkland et al. ............. 345/169 |
| 2006/0001650 A1* | 1/2006 | Robbins et al. .............. 345/173 |
| 2006/0119582 A1 | 6/2006 | Ng et al. |
| 2006/0176283 A1 | 8/2006 | Suraqui |
| 2006/0253793 A1 | 11/2006 | Zhai et al. |
| 2008/0316183 A1 | 12/2008 | Westerman et al. |
| 2009/0077501 A1* | 3/2009 | Partridge et al. ............. 715/846 |
| 2009/0144667 A1* | 6/2009 | Christoffersson et al. .... 715/863 |
| 2009/0184849 A1* | 7/2009 | Nasiri et al. .................... 341/20 |
| 2012/0036469 A1* | 2/2012 | Suraqui ......................... 715/773 |
| 2012/0117506 A1* | 5/2012 | Koch et al. ................... 715/773 |
| 2012/0223889 A1* | 9/2012 | Medlock et al. .............. 345/168 |

OTHER PUBLICATIONS

Myslewski, "Apple wants to swipe your iPhone—Patent application stretches multi-touch," Retrieved from http://www.theregister.co.uk/2008/12/29 1swipe_patent/print.html, accessed on Aug. 10, 2012, 4 pp.

"CalliGrapher® 5.3 for windows® CE Quick Start Guide," Retrieved from http://www.phatware.com/dock/qsg53/qsg3.html, accessed on Jul. 10, 2012, 5 pp.

"How can we improve SwiftKey, Gesture swiping from right to left for keyboard "delete" function," Retrieved from http://support.swiftkey.net/forums/116689-1-swiftkey-ideas-/suggestions/2748722-gesture-s, accessed on Aug. 10, 2012, 2 pp.

International Search Report and Written Opinion from International Application No. PCT/US2013/064880, mailed Dec. 10, 2013, 9 pages.

U.S. Appl. No. 60/430,338, by Daniel Suraqui, filed Nov. 29, 2002.

U.S. Appl. No. 60/505,724, by Daniel Suraqui, filed Sep. 22, 2003.

* cited by examiner

US 8,914,751 B2

CHARACTER DELETION DURING KEYBOARD GESTURE

CROSS-REFERENCE TO RELATED APPLICATIONS

This application claims the benefit of U.S. Provisional Application No. 61/714,672, filed Oct. 16, 2012, the entire content of which is incorporated herein in its entirety.

BACKGROUND

Many computing devices, such as mobile phones and tablet computers, provide a graphical keyboard as part of a graphical user interface for inputting text using a presence-sensitive display (e.g., a touchscreen). For instance, a computing device may present the graphical keyboard on a presence-sensitive display and thereby permit the user to enter data by tapping or otherwise positioning a finger at or near regions of the display that are associated with keys of the graphical keyboard.

In some cases, the computing device may present a virtual (or "soft") keyboard at a presence-sensitive display with which the user can input text by sequentially sliding a finger over regions associated with virtual keys corresponding to desired input characters. Said differently, using such a virtual keyboard, a user may input a word in a single gesture by tracing over representations of letters comprising that word (e.g., virtual keys of the virtual keyboard). In some implementations, the computing device references one or more gesture libraries and/or dictionaries to determine one or more candidate words based on the gesture. In this manner, a gesture-based keyboard may allow a user to achieve improved efficiency over traditional tap-typing techniques.

However, keyboards have certain drawbacks. For example, if a user inadvertently traces her finger over an undesired letter, many gesture-capable keyboards may require the user to lift her finger in order to correct the error. This requirement may significantly reduce the speed at which a user may enter text into a computing device using a gesture-capable virtual keyboard.

SUMMARY

In one example, a method includes outputting, by a computing device and for display at a presence-sensitive display, a graphical keyboard comprising a plurality of keys, and a text editor field. The method further comprises, in response to receiving an indication of a gesture detected at the presence-sensitive display that comprises a first path from a first key of the plurality of keys to a second key of the plurality of keys, outputting, for display at the text editor field of the presence-sensitive display, a first character associated with the first key and a second character associated with the second key. In response to determining, by the computing device, that the gesture further comprises a second path that retraces at least a portion of the first path from the second key to the first key, removing, from the text editor field of the presence-sensitive display and by the computing device, the second character.

In another example, a computing device comprising at least one processor and at least one module. The module may be operable by the at least one processor to output, by a computing device and for display at a presence-sensitive, a graphical keyboard comprising a plurality of keys and a text editor field. In response to receiving an indication of a gesture detected at the presence-sensitive display that comprises a first path, the module may be further operable by the at least one processor to output, for display at the text editor field of the presence-sensitive display and based at least in part on the first path, a first character associated with a first key and a second character associated with a second key. In response to determining, by the computing device, that the gesture further comprises a second path that retraces at least a portion of the first path, the at least one module may be operable by the at least one processor to remove, from the text editor field of the presence-sensitive display and by the computing device, the second character.

In another example, a computer-readable storage medium encoded with instructions that, when executed, causes at least one processor of a computing device to perform operations, including outputting, by a computing device and for display at a presence-sensitive display, a graphical keyboard comprising a plurality of keys, and a text editor field. In response to receiving an indication of a gesture detected at the presence-sensitive display that comprises a first path, the at least one processor of the computing device may cause the processor to further perform operations including outputting, for display at the text editor field of the presence-sensitive display and based at least in part on the first path, a first character associated with a first key and a second character associated with a second key. In response to determining, by the computing device, that the gesture further comprises a second path that retraces at least a portion of the first path, the at least one processor of the computing device may cause the processor to further remove, from the text editor field of the presence-sensitive display and by the computing device, the second character.

The details of one or more examples are set forth in the accompanying drawings and the description below. Other features and advantages will be apparent from the description and drawings, and from the claims.

DETAILED DESCRIPTION

Figure 1:
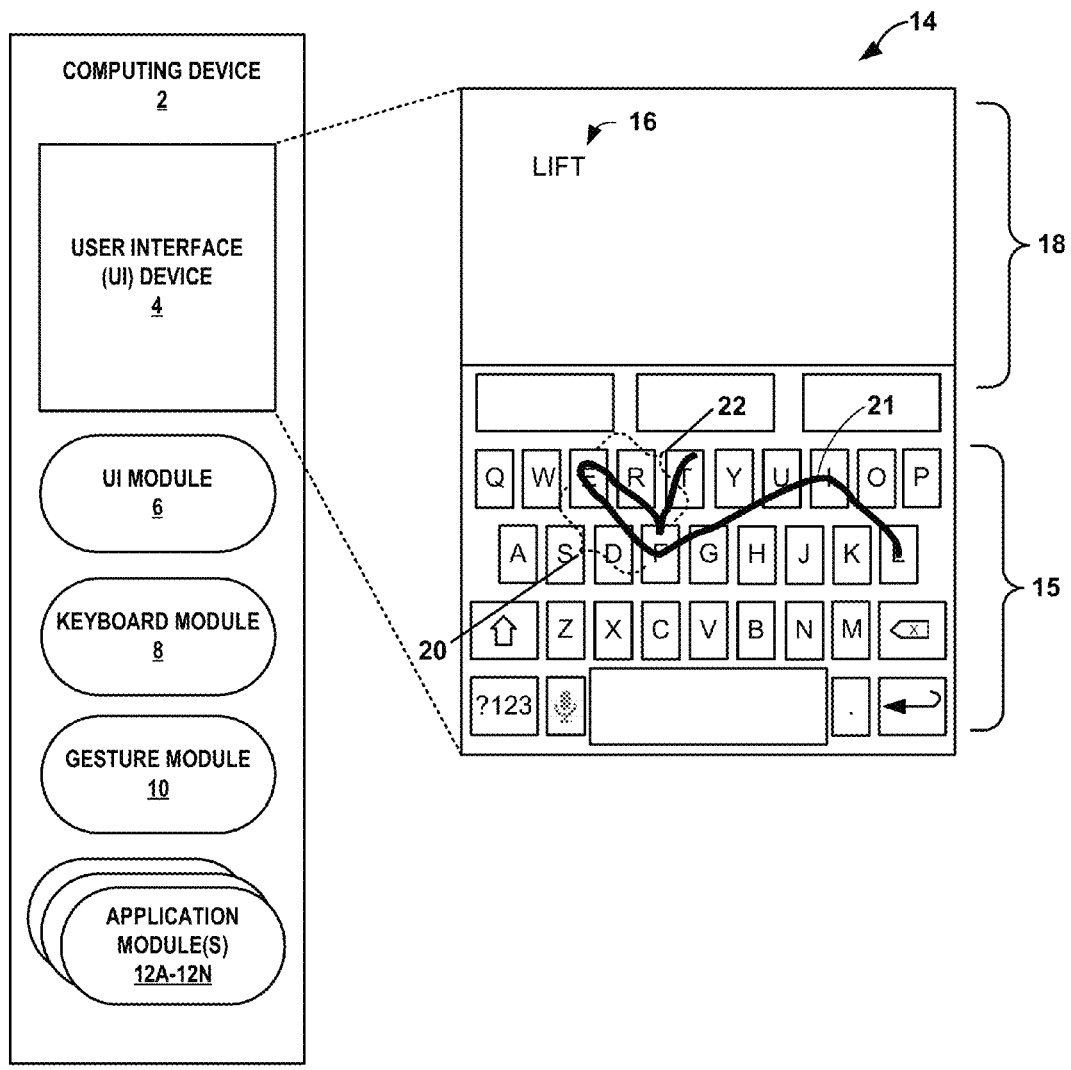
FIG. 1 is a conceptual diagram illustrating an example of a computing device for executing character deletion operations, in accordance with one or more aspects of the present disclosure.

In general, this disclosure is directed to techniques for deletion of characters input on computing devices that utilize a gesture-based virtual keyboard for text entry. The techniques may enable a user to correct an error in a text input gesture by indicating, during the gesture, deletion of one or more characters (for example, letters, numbers, symbols, or any combination thereof)—without requiring that the user restart the gesture. As the user enters text on a gesture-based keyboard using a continuous gesture, the user may perform a gesture to correct a character selection while entering the characters of a word. The computing device may correct the character selection in response to a deletion operation associated with the gesture, so that the user may continue the input gesture without, e.g., terminating the gesture (e.g., to select a backspace key or otherwise remove his/her finger from a presence-sensitive display of the computing device). Techniques of the disclosure may, therefore, provide certain advantages, such as improved text entry speed, efficiency, or accuracy for computing devices.

In one example of the techniques described herein, the user may initially interact with a gesture-based keyboard by sliding a finger along a path that traverses a portion of the keys of the graphical keyboard. Generally, a gesture is used to refer to the motion through which the user interacts with the presence-sensitive display from an initial detection of a finger to termination, e.g., by removing the finger from the presence-sensitive display. A gesture may terminate on a gesture keyboard when contact with the presence-sensitive display ceases, for example when the user raises a gesturing finger from the presence-sensitive display. Using the gesture-based keyboard, the user may perform a sliding gesture that includes a first path associated with a portion of the keys of the keyboard and so on to effectively draw a path through keys associated with characters of the a word. The user may release her gesturing finger when she completes entry for that word. As the user performs the sliding gesture, and in response to receiving the gesture, the computing device may output a first character associated with the first key, a second character associated with the second key, and so on until termination of the gesture is detected.

In accordance with the techniques described herein, if the user determines that she has incorrectly traced to the second key, for example, and therefore wishes to delete the second character, the user may perform a motion to retrace the first path. As described herein, the computing device may determine that the user has, in this manner, retraced at least a portion of the first path from the second key to the first key and delete the second character of the graphical user interface. The user may then continue performing the continuous gesture by tracing a gesture to a different key that is associated with the intended character. In this way, the user may not need to move her finger to the backspace key or remove her finger from the presence-sensitive display to delete the second character.

As one example, using a QWERTY gesture-based keyboard output by a presence-sensitive display, the user may input the word "life" by sliding a finger from the letters "l-i-f-e" in sequential order across the keyboard appearing at the graphical user interface. The user may wish to correct or change the word "life" to "lift" by deleting the last letter of life, the letter "e," and entering the letter "t" as a replacement. To do so, the user may retrace the portion of the gesture from the letter "e" back to the letter "f." In response to determining that the gesture retraces the path from "e" to "f", the computing device may delete the letter "e." The user may then continue the gesture from the letter "f" to the letter "t" to complete the word "lift." The path is the movement of the user's finger across the presence-sensitive display of the sliding gesture.

FIG. 1 is a conceptual diagram illustrating an example of a computing device deleting characters, in accordance with one or more aspects of the present disclosure. Computing device 2 may include one or more stand-alone devices or may be part of a larger system. For instance, computing device 2 may include a smart phone, tablet, personal digital assistant, computer, or other computing device. As shown in FIG. 1, client device 2 may include a user interface (UI) device 4, a UI module 6, a keyboard module 8, a gesture module 10, and one or more application modules 12A-12N. Other examples of a computing device 2 that implement techniques of the disclosure may include additional components not shown in FIG. 1. Computing device 2 may include UI device 4. In some examples, UI device 4 is configured to receive tactile, audio, or visual input. Examples of UI device 4, as shown in FIG. 1, may include a touch-sensitive and/or a presence-sensitive display or any other type of device configured for receiving input. UI device 4 may output content such as graphical user interface (GUI) 14 for display. In the example of FIG. 1, UI device 4 may be a presence-sensitive display that can display a graphical user interface and receive input from a user using capacitive or inductive detection at or near the presence sensitive display.

As shown in FIG. 1, computing device 2 may include user interface (UI) module 6. UI module 6 may perform one or more functions to receive input, such as user input or network data, and send such input to other components associated with computing device 2, such as keyboard module 8. UI module 6 may also receive data from components associated with computing device 2, such as keyboard module 8. Using the data, UI module 6 may cause other components associated with computing device 2, such as UI device 4, to provide output based on the data. For instance, UI module 6 may receive data from keyboard module 8 that causes UI device 4 to display GUI 14.

Computing device 2, in some examples, include keyboard module 8. Keyboard module 8 may include data for the layout of keyboard 15. The layout for the keyboard may include the location of each of the respective keys and letters, numbers, or symbols associated with each of the respective keys. Keyboard module 8 may include functionality to perform any variety of operations on computing device 2. For instance, as described in the example of FIG. 1, keyboard module 8 may include functionality of a graphic keyboard application that may send data to other components of computing device 2 for displaying a gesture keyboard, such as keyboard 15, at GUI 14. Keyboard module 8 may also receive data from components associated with computing device 2, such as gesture module 10. Based on the data, keyboard module 8 may determine a character entered by the user. Using the data, keyboard module 8 may cause other components associated with computing device 2, such as UI device 6, to provide output based on the data. For instance, UI module 6 may receive data from keyboard module 8 that causes UI device 6 to display GUI 14.

As shown in FIG. 1, GUI 14 may be user interface generated by keyboard module 8 that allows a user to interact with computing device 2. GUI 14 may include a graphical keyboard, such as keyboard 15, as shown in FIG. 1, that may include a plurality of keys and a text editor field for displaying entered text. For purposes of illustration in FIG. 1, keyboard 15 may be an image included in a graphic content file. UI module 6 may cause UI device 4 to display keyboard 15 at GUI 14, in accordance with techniques of the present disclosure further described herein.

Computing device 2, in some examples, may include gesture module 10. Gesture module 10 may perform one or more functions to receive input, such as detected gesture data, and send such input to other components associated with computing device 2, such as keyboard module 8. Gesture data may include the location of initial input detected at UI device 4, and any subsequent movement from the initial input location relative to UI device 4. Using the data, gesture module 10 may cause other components associated with computing device 2, such as UI device 4, to provide output based on the data. For instance, UI module 6 may receive data from gesture module 10 that causes UI device 4 to display at GUI 14 the trace, such as a line, that represents the path of the user's gesture. Traces generally may be a graphical representation of the location of the gesture at UI device 4. In one example, gesture module 10 may also receive data that includes when detection of the gesture ends, indicating input for the entered word ended.

Keyboard module 8 may include functionality to perform any variety of operations on computing device 2. For instance, keyboard module 8 may determine the gesture data received from gesture module 10 and keyboard layout data to determine characters entered by the user. As described in the example of FIG. 1, keyboard module 8 may include functionality of a graphic keyboard application that displays text in the editor field 18 based on the interpreted gesture. In another example, keyboard module 8 may also interprets gesture data received by gesture module 10 to indicate deleting characters of the word as the user enters the word.

Techniques of the present disclosure may improve the ease with which a user can delete a character while entering text on a gesture keyboard. Using techniques of the disclosure, a user may, instead of terminating the gesture to select a backspace key or delete the entire word, retrace a portion of the path associated with the character(s) for deletion without terminating the current gesture. The user can slide, or trace, a finger across the display to enter text and, as the user enters the word, by retracing a portion of the path to delete the characters associated with the retraced portion of the path. Moreover, GUI 14 may display a trace path, such as a line, to graphically represent the path that the user has traced and, therefore, as a graphical tool for aiding the user in identifying the path that the user should retrace should characters need to be deleted.

In one example, in response to receiving the data, keyboard module 8 may generate keyboard 15 for display. Providing the user with a text entry interface, keyboard module 8 may send to UI module 6 data comprising a graphical representation of keyboard 15. UI device 4 may then display keyboard 15 in graphical user interface 14. In the example of FIG. 1, keyboard 15 has a QWERTY keyboard layout. However, other keyboard layouts and arrangements may also be used in aspects of this disclosure.

In some examples, UI module 6 may receive data from UI device 4 that indicates one or more locations of the plurality of keys of keyboard 15 selected by the user. UI module 6 may determine keys associated with the one or more locations. UI module 6 may, in turn, cause UI device 4 to display characters associated with the one or more keys at text editor field 18. Text editor field 18 may display characters selected by the user and/or content from one or more files. Thus in some examples, UI module 6 may cause UI device 4 to display characters as the user selects keys associated with the respective characters using keyboard 15. Displaying entered text allows the user to view the text entered at keyboard 15 using techniques described in this disclosure.

For example, when the computing device 2 executes application 12A, a text messaging application, keyboard 15 may appear at GUI 14. In some examples, computing device 2 may determine a path of detect touch points following the gesture at locations of UI device 4. Some of the touch points along the path correspond to certain keys at a specific location of GUI 14 displayed by UI device 4. Computing device 2 may base the determine that certain touch points correspond to a key based on gesture data, such as characteristics of the path, change of direction, such as shape between touch points, speed of the gesture, etc. Computing device 2 may select the key, based on the gesture data and location of the detected touch point and the location of the displayed key. Computing device 2 may determine that certain touch points correspond to a particular key displayed at GUI 14, based on the location of the detected touch point and the location of the displayed key.

Computing device 2 may determine a character associated with the particular key and output the character at text editor field 18. In some examples, the location of the touch point may be at the location of the displayed key. In other examples, the location of the touch point may be proximate to the location of the displayed key. Computing device 2 may determine a character associated with the particular key and output the character at text editor field 18. As the user maintains contact with UI device 4 and as the gesture continues, computing device 2 may determine the next character computing device 2 may determine and determine a character based on the gesture data. The determined characters appear as a text message in text editor field 18 as UI device 4 detects the gesture at keyboard 15.

When performing a gesture at UI device 4 to select keys of keyboard 15 associated with characters of a particular word, for example, the user may wish to delete the most recently entered character or characters. Keyboard module 8 may implement techniques of the disclosure that enable a user to delete characters (for example, words, numbers, symbols, or any combination thereof). In FIG. 1, for example, when the user begins a gesture across UI device 4, UI device 4 detects one or more touch points at specific locations where the user's finger traverses UI device 4. In some examples, the one or more touch points may indicate a path from each respective location to another. Gesture module 10 may send gesture data that represents the path and/or one or more touch points, and send the gesture data to keyboard module 8.

Keyboard module 8 may receive the gesture data. Using the gesture data, keyboard module 8 determines the path of the gesture, and may send to UI module 6 graphical data representing one or more tracing lines, or traces, such as trace 21 of FIG. 1. Keyboard module 8 may send the graphical data to UI module 6, causing UI device 4 to output trace 21 at GUI 14. Keyboard module 8 may also cause UI device 4 to display the characters entered based on the detected gesture at text editor field 18.

For example, as illustrated in FIG. 1, the user may execute a text message application 12A, causing UI device 4 to output GUI 14, including keyboard 15 with text editor field 18. Keyboard 15 displays a plurality of keys associated with a character in a QWERTY layout. When the user begins to enter the word "life," UI device 4 may detect the initial input of user's finger on the letter "l." Gesture module 10 receives gesture data from UI device 4 about the detected initial input and sends the gesture data to keyboard module 8. Keyboard module 8 determines that the initially entered letter is "l" based on the point of the initial input and the GUI 14 output of the key at that location associated with the letter "l." As the user continues to enter the next letters of the word by sliding the finger from "l" to "i" to "f," UI device 4 detects the detected data to gesture module 10. Gesture module 10 determines, based on the gesture data, including movement, direction, speed, shape of the path, etc., if the user is entering characters or indicating a deletion operation. Keyboard module 8 receives the gesture data and responsively determines that the gesture begins at the point corresponding to the key associated with the letter "l" of keyboard 15. Keyboard module 10 may then send graphical data indicating a display of trace 21 from "l-i-f" to UI module 6 for output by UI device 4 at GUI 15 at keyboard 15. Display data may also indicate display of the associated characters "lif" for display at text editor fields 18.

Keyboard module 8 may also then determine that the gesture data, including the path of the gesture and the speed of the gesture, indicates the path continues to slide across GUI 14's output of keyboard 15, so that the user does not release contact with UI device 4, to a second point corresponding to another second key corresponding to the next character of the entered word "life," i.e., the letter "i." Keyboard module 8 may determine that the user is entering keys based on the points associated with the location of the keys at GUI 14. The points, for example, may determine a particular shape to the path. For example, the shape at keys "i" and "f" indicate a change in direction that keyboard module 8 may determine as the user entering the targeted key and continues the gesture to the next character of the entered word. The detected points, forming the path shape that indicates a change in direction, causes keyboard module 8 to send indications for the letters "l" "i" and "f" to UI module 6 for output at GUI 14.

Other points may form a path shape that indicates a deletion operation. For example in FIG. 1, the gesture path continues from the keys associated with the letters "f-e." The gesture data received by keyboard module 8 may indicate points at the letter "e" indicating a substantial change in direction. The gesture data may also indicate that after the substantial change in direction, the gesture retraced at least a portion of a path from letters "f-e" 20, when the gesture continued a retraced, or second, path from letters "e-f" 22. Keyboard module 8 determines, based on the shape of the path and the retraced portion of the path, that the motion indicates a deletion of the last character. The retraced path 22 does not need to follow the exact path or retrace to the exact location. Instead, keyboard module 8 may determine deletion of the last character entered when retraced path 22 retraces to any part of the key. Keyboard module 8 deletes that characters associated with the retraced path 22, such as the letter "e," and removes the deleted letter from text editor field 18. When the user maintains contact with UI device 4, keyboard module 8 continues to determine characters of the word from that point, such as determining, after the letter "f," that user enters the key associated with the letter "t." Keyboard module 8 then causes text editor field 18 of GUI 14 to output a "t" at the end of the displayed word, for example "lift" 16. Keyboard module 8 also causes UI device 4 to display trace 21 from the letters "f-t." In some examples, keyboard module 8 may cause UI device 4 to remove trace 21 from GUI 14 from the letters "f-e," graphically representing to the user that the these letters are no longer part of the entered word as displayed at text editor field 18.

After the user completes entry of the word, the user may release contact with UI device 4 indicating entry for that word is complete, and computing device 2 associates subsequent gestures with a respective subsequently entered word. In this way, computing device 2 enables the user to use a continuous gesture for entering the characters of a word, for example, yet allows the user to delete one or more characters without terminating the current gesture. As such, the techniques may improve typing speed with a useful way for the user to replace words with alternative words. As such, even upon making an error, the techniques allow the user to continue to enter text without having to lift a finger, delete the entire word, or seek out a backspace key outside of the focused typing area of the keyboard, which may save time or otherwise improve text entry efficiency.

Figure 2:
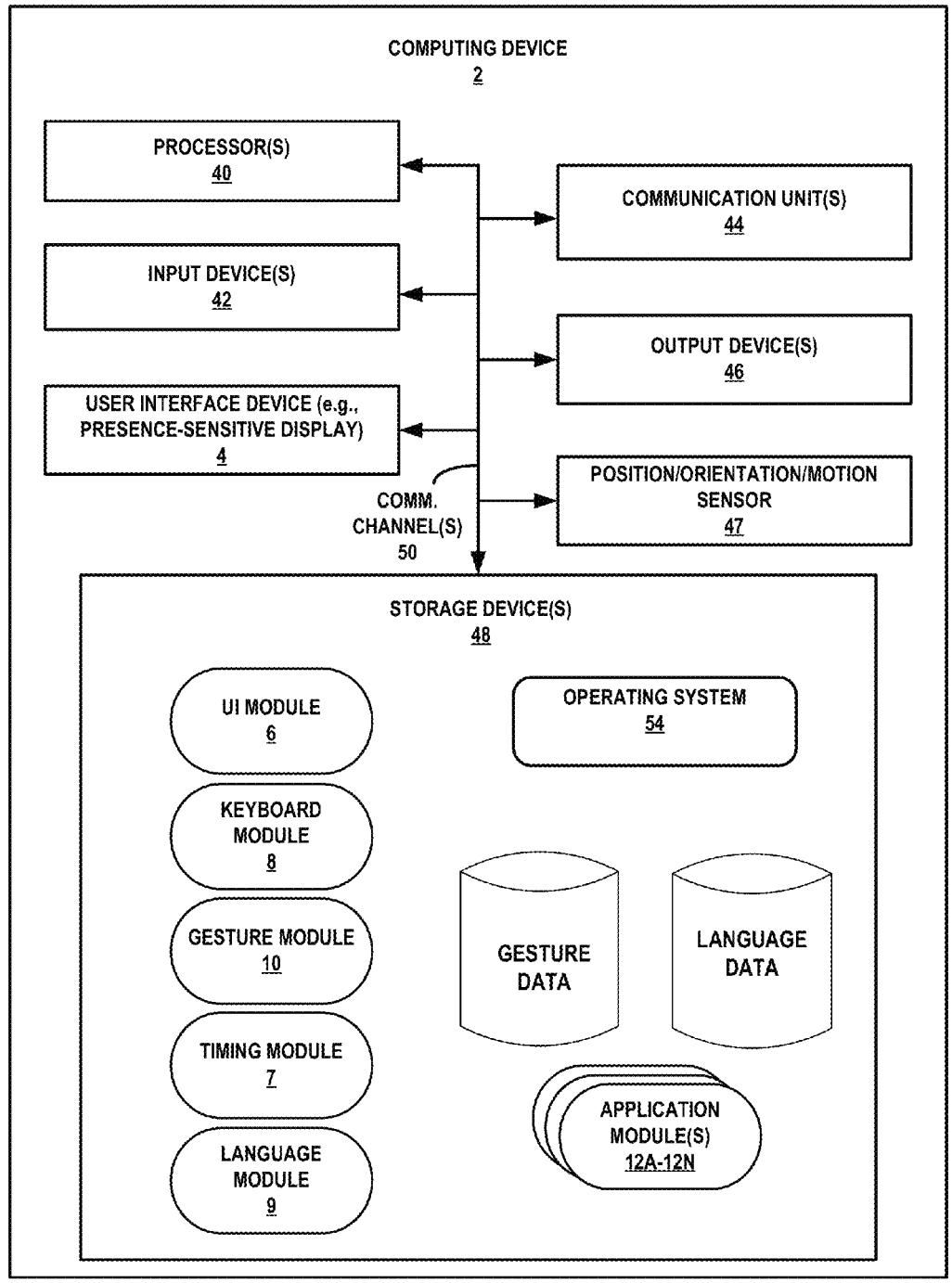
FIG. 2 is a block diagram illustrating an example of the computing device of FIG. 1 in further detail.

FIG. 2 is a block diagram illustrating an example computing device for executing character deletion operations, in accordance with one or more aspects of the present disclosure. FIG. 2 illustrates one example of computing device 2, and many other examples of computing device 2 may be implemented.

As shown in the specific example of FIG. 2, computing device 2 may include one or more processor(s) 40, a communication unit(s) 44, one or more storage devices 48, one or more input device(s) 42, one or more output device(s) 46, user interface (UI) device 4, and a position/orientation/motion (POM) sensor 47. Although shown in FIGS. 1 and 2 as a stand-alone computing device 2 for purposes of example, a computing-device may be any component or system that includes a processor 40 or other suitable computing environment for executing software instructions and, for example, need not include presence-sensitive display 4.

Computing device 2, in one example, further includes applications 12A-N ("applications 12") and operating system 54 that are executable by computing device 2. Each of components 4, 40, 42, 44, 46, 47, and 48 may be interconnected (physically, communicatively, and/or operatively) for inter-component communications. In some examples, communication channels 50 may include a system bus, network connection, interprocess communication data structure, or any other channel for communicating data. As one example in FIG. 2, components 4, 40, 42, 44, 46, 47, and 48 may be coupled by one or more communication channels 50. Applications 12 (including modules 6, 7, 8, 9, and 10) and operating system 54 may also communicate information with one another as well as with other components in computing device 2.

Processors 40, in one example, are configured to implement functionality and/or process instructions for execution within computing device 2. For example, processors 40 may be capable of processing instructions stored in storage device 48. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within computing device 2 during operation. Storage device 48, in some examples, is described as a computer-readable storage medium. In some examples, storage device 48 is a temporary memory, meaning that a primary purpose of storage device 48 is not long-term storage. Storage device 48, in some examples, is described as a volatile memory, meaning that storage device 48 does not maintain stored contents when the computer is turned off. Examples of volatile memories include random access memories (RAM), dynamic random access memories (DRAM), static random access memories (SRAM), and other forms of volatile memories known in the art. In some examples, storage device 48 is used to store program instructions for execution by processors 40. Storage device 48, in one example, is used by software or applications running on computing device 2 (e.g., applications 48) to temporarily store information during program execution.

Storage devices 48, in some examples, also include one or more computer-readable storage media. Storage devices 48 may be configured to store larger amounts of information than volatile memory. Storage devices 48 may further be configured for long-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes one or more communication units 44. Computing device 2, in one example, utilizes communication unit 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth, 3G and WiFi radios computing devices as well as Universal Serial Bus (USB). In some examples, computing device 2 utilizes communication unit 44 to wirelessly communicate with an external device such as remote servers, or any other computing device.

Computing device 2, in one example, also includes one or more input devices 42. Input device 42, in some examples, is configured to receive input from a user through tactile, audio, or video feedback. Examples of input device 42 include a presence-sensitive display, a mouse, a keyboard, a voice responsive system, video camera, microphone or any other type of device for detecting a command from a user. In some examples, a presence-sensitive display includes a touch-sensitive screen.

One or more output devices 46 may also be included in computing device 2. Output device 46, in some examples, is configured to provide output to a user using tactile, audio, or video stimuli. Output device 46, in one example, includes a presence-sensitive display, a sound card, a video graphics adapter card, or any other type of device for converting a signal into an appropriate form understandable to humans or machines. Additional examples of output device 46 include a speaker, a cathode ray tube (CRT) monitor, a liquid crystal display (LCD), or any other type of device that can generate intelligible output to a user. In some examples, UI device 4 may include functionality of input device 42 and/or output device 46. In the example of FIG. 2, UI device 4 may be a touch-sensitive screen.

Computing device 2 may include operating system 54. Operating system 54, in some examples, controls the operation of components of computing device 2. For example, operating system 54, in one example, facilitates the communication of keyboard module 8 with processors 40, communication unit 44, storage device 48, input device 42, POM sensor 47, UI module 6, and output device 46. As shown in FIG. 2, keyboard module 8 may include timing module 7 and language module 9, as described in FIG. 1. Keyboard module 8 may each include program instructions and/or data that are executable by computing device 2. As one example, keyboard module 8 may send to UI module 6 instructions that cause computing device 2 to perform one or more of the operations and actions described in the present disclosure.

In accordance with techniques of the disclosure, keyboard module 8 may initially cause UI device 4 to display a graphical user interface that includes a gesture keyboard, such as keyboard 15 of GUI 10 shown in FIG. 1. In accordance with techniques of the disclosure, the user may perform a touch gesture at a location of UI device 4. UI device 4 may detect the touch gesture and, in response, keyboard module 8 may determine whether the touch gesture is at a location associated with of one of the respective keys of keyboard 15 of GUI 14. If the touch gesture is not initially at a location associated with of one of the respective keys of keyboard 15, UI module 6 may ignore the gesture or perform a different operation that is not related the techniques of this disclosure.

As shown in FIG. 2, storage device 48 further includes gesture module 10, a, language module 9, and timing module 7. As discussed above, gesture module 10 includes instructions and data that, when executed by processor(s) 40, provides computing device 2 with character deletion operation functionality. Keyboard module 10 includes instructions and data that, when executed by processor(s) 6, permits computing device 2 to present a virtual keyboard, such as keyboard 15 at GUI 14, as shown in FIG. 1. Language module 9, when executed by processor(s) 40, provides computing device 2 with functionality to generate and present a suggested word list. Language module 9 contains one or more known lists of correctly spelled words against which a suggested word list module may compare the user entered text to generate a list of suggested words. In some examples, language module 9 may also include a list of user-customized words.

To provide deletion operation functionality, gesture module 10 includes instructions that when executed by processor(s) 40 of computing device 2, permit computing device 2 to detect any deletion operations. The deletion operation may include one or more movements detected that computing device 2 interprets as a command to perform the deletion function. For example, the deletion operation may include the user sliding a finger or other input tool, such as a stylus, pen, brush, etc., across the presence-sensitive display to retrace at least a portion of a path. This motion may, for example, include a predefined pattern, such as a scrubbing motion, as the user retraces the path.

Gesture module 10 includes deletion operation data corresponding to one or more predetermined deletion operations. For example, a deletion operation typically may include a plurality of points of contact made in a predetermined pattern within a display area of user interface device 4. To that end, the deletion operation data may include a set of ordered coordinates corresponding to the relative order and position for each point of contact that makes up the deletion operation. The deletion operation data may further include relative time information received from timing module 7 corresponding to each point of contact in the deletion operation. The relative time information may be indicative of the relative time at which the ordered points of contact should occur. The relative time information may determine if the gesture occurred quickly, indicative of the user quickly performing a deletion operation and slowing relative to the speed of the character entry speed. The time information may include a longer time between certain touch points compared to a relatively short time between other touch points, indicative of a pause when the user considers if a character should be deleted. Timing module 7 may send the relative time information to the gesture module 10 to associate the ordered points of contact, or touch points, with the relative time information. Gesture module 10 may determine if the portion of the user's gesture with a certain entry speed is to be considered a deletion operation. For example, if the relative time between two points of contact is too large, gesture module 10 may determine that the points of contact do not correspond to part of a deletion operation. In some examples, gesture module 10 may use a threshold to determine if the speed is above the threshold, indicating a deletion operation, or below the threshold indicating a pause identifying an incorrectly entered character.

The touch input is analyzed by processor(s) 40 under control of gesture module 10 to identify whether any of the touch input corresponds with a predetermined deletion operation. For example, processor(s) 40 may compare the touch input with the gesture data to detect whether the touch input includes a predetermined deletion operation. The gesture data sent to keyboard module 8.

Keyboard module 10 includes graphical user interface layout data. For example, a keyboard typically may include a plurality of keys, which are each associated with at least one respective character, displayed in a predetermined pattern within a display area of user interface device 4. To that end, the keyboard layout data may include a set of ordered graphics corresponding to the relative order and position for each point that makes up the graphical display, or keyboard. When keyboard module 10 receives the gesture data, keyboard module 10 responsively compares the gesture data to the layout of the graphical user interface. Keyboard module 8 determines if the relative gesture data may be indicative of the relative key at the particular layout location which the ordered points of contact should occur to be considered as part of a deletion operation. Additionally, keyboard module 8 may determine if the gesture data associated with a location of the keyboard layout is indicative of entering a character or deleting a character. For example, if the touch points indicate a change in direction and then retrace a substantial portion of the path associated with the most recently entered character, keyboard module 8 may determine that the points of contact at the particular location associated with the GUI correspond to a deletion operation.

In one example, the gesture data and GUI layout data is analyzed by processor(s) 40 under control of keyboard module 8 to determine whether any of the gesture data corresponds to a predetermined deletion operation or with further character entry. For example, processor(s) 40 may compare the touch input location and speed with the keyboard layout data to determine whether the touch input indicated a deletion operation or further character entry.

In one example, keyboard module 8 may use a threshold at least as a factor in determining whether the compared data is indicative of a deletion operation. Keyboard module 8 compare a threshold distance to the distance traversed by the portion of the path associated with the last character entered. For example, the threshold distance may be compared with the distance where the user changes direction to retrace the path and traverse keyboard 15 at least back to the edge of the key entered before the incorrectly entered character. For example, in FIG. 1, the threshold is the distance from the edge of key "f" next to key "d" and extends to the path at key "e" where the direction changes for the retracing. Retraced portion 21 of FIG. 1 meets the threshold by extending from key "e" back to the key "f." To this end, keyboard module 8 determines that retracing at least a portion of a previous path of the gesture exceeds the threshold distance and, therefore, is indicative of a deletion operation based on the change in direction at key "e" and the retraced path 22 returning to key "f." Using a threshold to determine a deletion operation is further illustrated in the example of FIG. 4.

In another example, keyboard module 8 may determine that the gesture is indicative of a deletion operation based at least in part on language module 9. Language module 9 includes language data corresponding to one or more predetermined combinations of letters. For example, a word is typically made up of combinations of letters and languages typically include words made up of predetermined patterns letters. The entered characters may be compared to the language data, including words and combination of letters, of language module 9 to determine a word that may match the entered characters. When keyboard module 8 determines that there is no likely word match, keyboard module 8 may then determine that retracing at least a portion of a previous path of the gesture is a deletion operation. To this end, keyboard module 8 may determine if the retraced portion indicates a possible word match based on language data or indicates deleting the portion of the retraced path from the path.

In another example keyboard module 8 may determine the data is indicative of a deletion operation based at least in part on position data of computing device 2. For example, computing device 2 may include an accelerometer or gyroscope, for example as illustrated as illustrated in FIG. 2 position/orientation/motion ("POM") sensor 47, which generates physical orientation data. Gesture module 10 may use the physical orientation data to determine a physical orientation of computing device 2 relative to a reference point. A physical orientation of computing device 2 may include a vertical orientation presence-sensitive display 4 is oriented approximately perpendicular to a reference point, e.g., a surface on which the user stands. Another physical orientation of computing device 2 may include a horizontal orientation wherein UI device 4 is oriented approximately parallel to a surface on which the user stands. Gesture module 10 may select different physical location data from stored in gesture module 10 based on the physical orientation of computing device 2. For instance, the gesture data stored on computing device 2 may each be associated with information specifying a physical orientation of computing device 2. Information may specify a horizontal physical orientation and a vertical physical orientation. Some touch points may be associated with information indicating a deletion operation. In addition, vertical and horizontal physical orientation data may be associated with information indicating a deletion operation of computing device 2. Gesture module 10 may send the gesture data, including the physical orientation data with the gesture data to keyboard module 8.

In reference to the example of FIG. 1, a user may enter letters "l-i-f-e" at keyboard 15 and realize that the end "e" was incorrect. Gesture module 10 may determine computing device 2 is positioned in a horizontal orientation, e.g., the user is holding computing device 2 flat in his/her hand. When the user deletes the "e" by retracing at least a portion of second path 22 associated with the last entered character, from key "e" to key "f," the user may rotate computing device 2 to retrace. Gesture module 10 may determine the change in the physical orientation computing device 2 by comparing data regarding the previous physical orientation and position of computing device 2. In another example, the user may lift computing device 2 closer to their face when they retrace second path 22. Gesture module may determine the change in physical orientation based on a determined change in data. In this way, gesture module 10 may include the physical orientation data and the position data, including an indication of changes, in the gesture data sent to keyboard module 8.

Upon determination of deletion operation, processor(s) 40, under control of keyboard module 8, may cause text editor field 18 to remove the last user entered character corresponding to the portion of the path retraced. For example, keyboard module 8 causes text editor field 18 to remove the last character entered. Without releasing contact from UI device 4, the user continues to enter characters by continuing the gesture from the last retraced point to the next character. The subsequently entered character will appear in text editor field 18 where the deleted character appeared. In the example of FIG. 1, upon detection of deletion operation, second path 22, at keyboard 15, computing device 2 has replaced the lastly entered character, changing word 16 from "life" to "lift." Computing device 2 stores the deletion operation data in association with the physical orientation and position data that indicate a gesture deletion, and may access the data to determine if other gestures are deletion operations.

FIG. 3 is a conceptual diagram illustrating a graphical user interface at a computing device for performing a character deletion operation, in accordance with one or more aspects of the present disclosure. FIG. 3 illustrates one example of a graphical user interface output at computing device 2, and many other examples of GUIs may be output.

Figure 3A:
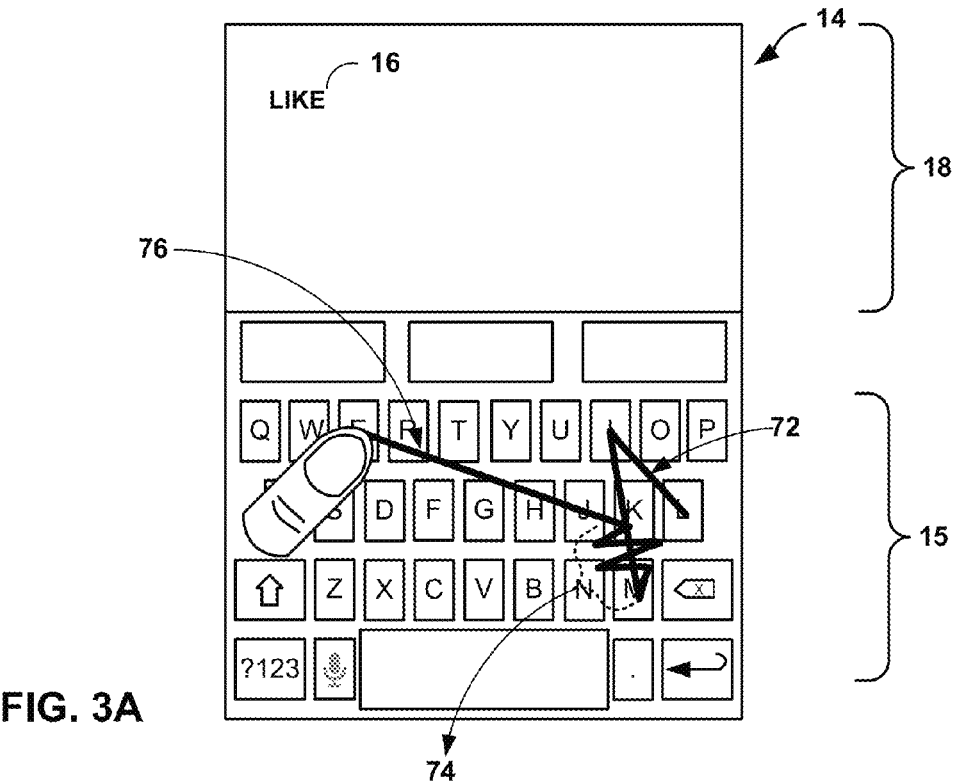
FIGS. 3A and 3B are conceptual diagrams illustrating a graphical user interface at a computing device for performing a character deletion operation, in accordance with one or more aspects of the present disclosure.

For example, as illustrated in FIG. 3A, computing device 2 may output a plurality of characters, such as the characters "lim" initially displayed in response to the user's gesture across the associated keys "l" then to "i" followed by "m" respectively at text editor field display area 16 of GUI 14. UI device 4 may output trace 72 as a graphical representation of the path. When the user wants to delete the letter "m" and instead enter "k-e" to enter the word "like," without releasing contact with UI device 4, the user retraces the path from "m-k," such as the portion of trace 72 indicated in FIG. 3A as second path 74, to indicate deleting the letter "m."

Second path 74 may have a particular shape, indicating a deletion operation of the retraced portion. Computing device 2 may store different shape patterns associated with possible deletion operations. The stored patterns may be used to determine that the gesture matches a stored pattern. For example, computing device 2 may store a changed in direction of the gesture at a particular key, so that the change in direction substantially reversed the gesture direction. Additionally, the path shape may have a distinct shape, such as a substantially sinusoidal pattern, in association with a deletion operation, distinguishing the gesture from a character entry gesture. In response to determining that the traced path is substantially sinusoidal in shape, computing device 2 may compare the substantially sinusoidal shape with stored gestures and determine a possible match with the deletion operation. In response to the match, computing device 2 may remove from the text editor field 18 the character "m," which is associated with second path 74.

Without releasing contact, the user may continue entering characters at UI device 4 by continuing the gesture from the substantially sinusoidal shape portion of second path 74, at least back to key "k." If the deletion operation goes beyond key "k," computing device 2 may interpret the deletion operation to indicate deleting the path and the characters associated with the deleted path. For example, a substantially sinusoidal retrace back to key "i" will cause computing device 2 to determine deleting the last character entered, for example the letter "m." Due to retracing back beyond key "k" for the word "like," computing device 2 determines the deletion operation deletes the last character, so that only "li" remain displayed at text editor field 18. Without releasing contact with UI device 4, the user may continue the gesture to key "k" and then "e," as illustrated by trace 76, for completing entry for the word "like." In response to detecting the continued gesture, the complete word "like" 16 may then appear in text editor field 18. In some examples, keyboard 15 may delete a portion of trace 72 associated with the deletion operation, so that only a graphical representation of the gesture input for the word "like" 16 is displayed at UI device 4.

Figure 3B:
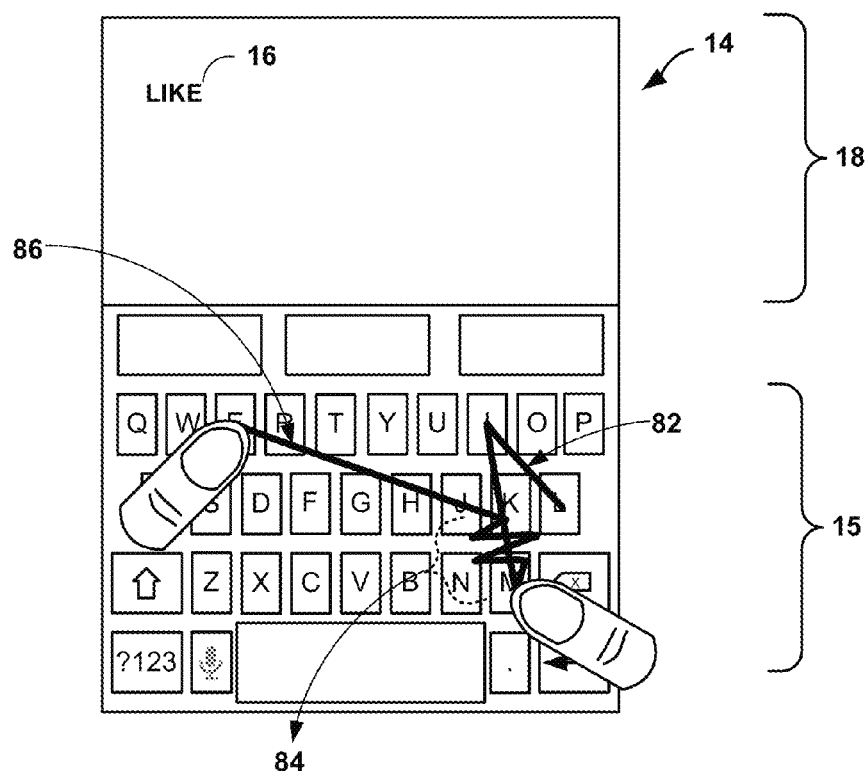

In another example, as illustrated in FIG. 3B, computing device 2 may determine that the portion of the gesture indicates deletion of a character by detecting a second finger touching UI device 4. For example, the user enters the letters "l-i-m" with a gesture along a particular path, which trace 82 graphically represents, using gesture techniques as described in this disclosure. Computing device 2 may detect the user's other finger retracing the portion of the gesture path associated with the incorrectly entered character, such as retracing second path 84, causing computing device 2 to remove the letter "m" from text editor field 18. The user's finger that initiated the gesture may remain in contact while the second finger retraces the path. After the second finger retraces the portion of the path associated with the incorrectly entered characters, such as second path 84, while maintaining contact with UI device 4, the second finger may continue the gesture from the letter "k" to the letter "e," causing computing device 2 to display the word "like" at UI device 4. Computing device 2 may determine the end of the word entry when both fingers are released from UI device 4.

Computing device 2 may store gesture data that includes data associating two detected objects gesturing in certain patterns, such as substantially sinusoidal patters, to indicate a deletion operation. Computing device 2 may use the gesture data at a later time to determine deletion operations.

In one example, the computing device determines a speed at which the finger traversed the second path and, when the speed is above a threshold speed, the computing device removes the second character from the text editor field of the presence-sensitive. As illustrated in the example of FIG. 3A, the computing device may determine the speed of the movement of the gesture illustrated by trace 72. As computing device 2 detects the gesture traversing the UI device 4, the computing device may determine the speed of the gesture by detecting the gesture from point to point and determine the time between point to point in the order of the detected gesture of the time between points. When portion of the gesture, such as trace portion 74 has a speed above a threshold, computing device 2 may utilize this as an additional indicator in determining that this portion of the gesture indicated a deletion operation for characters represented by that portion of the gesture, e.g., illustrated by trace portion 74. The threshold may be a predetermined speed stored in computing device 2. It may be a determined threshold based on the speed of the parts of the gesture, for example the portion of the gesture at the portion of trace path 72 and 76 may be slower due to the user locating the words and seeking out the keys of the keyboard compared to trace path portion 74 where the user may gesture quickly to delete that portion of the gesture. The computing device may determine that the difference in speed of the portions of gesture path 74, compared to gesture paths 76 and 72, may indicate deleting path portion 74. Alternatively, the gesture at the portion of trace path 72 and 76 may be faster due to a slowed deletion operation of retraced path 74 where the user may gesture slow the speed of the retraced portion due to gesture movement in a sinusoidal pattern.

In another example, the computing device may remove the second character from the text editor field of the presence-sensitive display, when no gesture movement is detected between the gesture of the first path and the gesture of the second path for at least a period of time. As illustrated in FIG. 3A, computing device 2 may detect gesture path 72 and may detect no movement at key "m" for a period of time, such as 0.25-1.5 seconds before detection of movement traversing the presence-sensitive display continues along gesture paths 74 and 76. The pause may occur due to the use identifying a mistake or identifying the portion of the path that for retracing before continuing the gesture. The computing device may determine that the pause in movement at key "m" indicates deleting a character recently entered. Computing device 2 may determine that subsequent movement in the sinusoidal shape along gesture path portion 74 indicates a deletion of the last character entered, associated with gesture path portion 74.

In one example, the computing device detects, at the presence-sensitive display, the gesture of the first path and the gesture of the second path within a predetermined period of time. As illustrated in FIG. 3A, traversing keyboard 15 from key "k" to key "m" may occur within a period of time. The period of time may be based on the original first portion of the gesture, for example from the key "k" to key "m." The computing device may determine that a trace gesture occurs faster or slower than the original trace. For example, trace portion, or second portion 74 occurs faster or slower that the first portion of gesture path 72 from key "k" to key "m." The computing device may determine the time for tracing a path (from key "k" to key "m") that then retracing the portion of the path (from key "m" to key "k"). When the tracing of a portion and then retracing that portion occurs within a period of time that is based on the time of the first path (from key "k" to key "m").

In another example, in response to determining, by the computing device, that the second path retraces a portion of the first path associated with more than one determined character, removing, from the text editor field of the presence-sensitive display and by the computing device, the more than one determined character associated with retraced portion. As illustrated in FIG. 3A, the retraced portion of gesture path 74 from key "m" to key "k" in a sinusoidal shape indicates deleting the last character, or characters, entered, associated with the portion of gesture from key "k" to key "m" due to the retraced portion to key "k." More than one character may be deleted using the disclosed gesture, for example if the deletion operation traverses the display beyond key "k," such as to key "i." Computing device 2 may delete the characters associated with the gesture portion of the gesture path to key "i" and responsively delete the letters appearing in text editor field 18 back to the letter "i," so that only "l-i" appear for word 16. Using this technique, retracing portion 74 may extend from key "m" to key "i," and continue to key "l" so that computing device 2 removes all characters of the currently inputted word 16 back to the first letter "l" of the gesture.

In one example, in response to determining, by the computing device, that the gesture further comprises a second path that retraces at least a portion of the first path from the second key to a third key between the first key and the second key, the computing device removes, from the text editor field of the presence-sensitive display, the second character and displays, at the text editor field of the presence-sensitive display, a third character associated with the third key. As illustrated in FIG. 3A, the gesture of the gesture path 72 from "l-i-m" causes text editor field 16 to display "l-i-m." To replace the letter "m" with the letter "k" of the word, the user may retrace the portion of the gesture path associated with the characters to be deleted from text editor field 16. In the current example, the gesture path traverses the display at the letters "l-i-m." To replace "m" with "k" in the word 16 of text editor field 18, the gesture path portion 74 retraces the original gesture path 72 from key "m" to key "k," which appears between key "m" and key "i." Computing device 2 determines that the gesture indicates characters "l-i-k" and causes text editor field 18 to display these characters. The gesture may then continue from key "k" to key "e" to complete the word "like" as displayed at word 16. This technique allows the user to correct the character without having to delete the entire last path of the gesture representing the last letter, and allows the user to only delete the portion up to a point associated with the next letter of the word.

In another example, computing device 2 utilizes a language module, and when there is no match, removes the character when a retracing operation has been performed. As illustrated in FIG. 3A, as gesture path 72 traverses the display, computing device may compare the gesture with a language model to determine a word that matches the gesture. When a match score is not determined, such as a match score of zero is determined, computing device 2 may determine that a portion of the gesture is incorrect or indicates deletion of a portion of the gesture. In FIG. 3A, a match score of zero may be determined for letters "l-i-m-k-e." Computing device 2 may determine, as the gesture occurs or after the gesture, that the match score is zero and that gesture path portion 74 retraces from keys "m" to "k." Computing device 2 may then determine that deletion of "m-k" indicates a gesture from "l-i-k" that may match potential words or character combination of the language model. The complete gesture traversing keys "l-i-k-e" matches the word "like."

In one example, computing device 2 may output a graphical representation of the first and second paths based on the detected gesture. As illustrated in FIG. 3A, the gesture may begin at a location of the presence-sensitive display, such as associated with the key "l." As the gesture continues to traverse the display, UI device 4 may output a graphical representation of the gesture, such as trace line 72, as part of the graphical user interface that includes keyboard 15 representing the approximate location where the gesture input was detected. Trace line 72, 74, and 76 indicate the approximate location of where the gesture traversed the presence-sensitive display. The graphical representation enables the user to identify where the gesture occurred, and quickly and delete characters responsive to continued gesture movement.

In another example, computing device 2 may remove the portion of the outputted indication representing the second path that retraces at least a portion of the first path from the second path. As illustrated in FIG. 3A, when computing device 2 determines that the gesture indicates removing one or more characters responsive to the gesture, such as the retraced portion of the gesture path 74, then computing device 2 may cause UI device 4 to output just the trace representing the gesture input without the deleted portion. In FIG. 3A, trace line 72 from letters "l-i-k" would appear as is illustrated, but trace portion 74 would not appear from keys "k" to "m." The trace line would continue from key "k" to key "e," as indicated by trace line 76. The trace line, in this example, represents the detected gesture that computing device 2 uses to determine the characters.

In one example, removing, from the text editor field of the presence-sensitive display and by the computing device, the second character, is further in response to detecting a substantial change in direction of the second path relative to the first path. As illustrated in FIG. 3A, to retrace the gesture path, the gesture must substantially reverse direction. For example, when entering "like," the gesture may include "l-i-k-m." To delete "m" from the entry, the gesture movement may retrace the portion of the path to be deleted, such as "k-m" must be retraced by gesturing from "m-k." The movement of the gesture when retracing, substantially reverses direction, or changes near 180 degrees in direction, so that the path is substantially retraced. Computing device 2 may determine that such a change in direction indicates retracing a portion of the path for deletion.

As discussed, computing device 2 may detect if one, two, or more objects are detected and determine the characters entered based on the objects and the gesture of each of the detected objects. As illustrated in FIG. 3B, one object, such as a finger may input a word at keyboard 15 by tracing the word. As the finger remains in contact with the presence sensitive display, the user may use another finger, such as a finger of their other hand, to delete a portion of the gesture. Computing device 2 determines that the second object retraces a portion of the gesture path gestured by the second object, such as the sinusoidally shaped portion of gesture path 84, and, therefore, indicates deletion of the retraced portion of the gesture path from key "m" to key "k," which results in removal of the associated characters from text editor field 18. The second object may retrace the portion of the path after the word has been entered, for example in FIG. 3B when the user has traversed the display across keys "l-i-m-k-e" with a finger of their left hand. As this finger rests at key "e," a second finger, such as a finger of the user's right hand, may retrace in a sinusoidal path from key "m" to key "k." Computing device 2 may determine that input from the second object, or the second finger, indicates deleting the portion of the gesture associated with the detected input from the second object.

In another example, the second object may retrace a portion of the gesture, indicating deletion of the character recently entered, as computing device 2 detects the gesture. For example, a first finger, or object, may traverse the display from key "l" to key "k" to key "m." As the first finger remains in contact with key "m" without movement, computing device 2 may detect a second finger retracing a portion of the path the path, such as retraced portion 84, and continuing from key "k" to key "e" illustrated as portion of gesture path 86. Computing device 2 may determine that the detected input from the second object retraces a portion of the gesture path at retraced portion 84 and determines that the gesture path of the second object indicates further gesture input.

Figure 4:
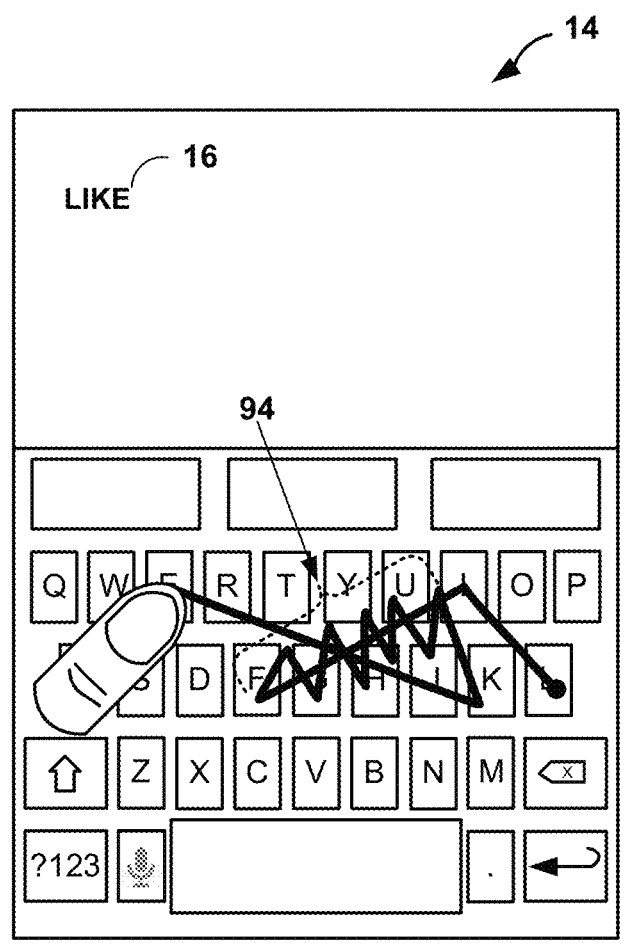
FIG. 4 is conceptual diagram illustrating a graphical user interface at a computing device using a threshold for determining a deletion operation, in accordance with one or more techniques of the present disclosure.

FIG. 4 is conceptual diagram illustrating a graphical user interface at a computing device using a threshold distance as one factor in determining a deletion operation, in accordance with one or more techniques of the present disclosure. As discussed above, keyboard module 8 may use a threshold distance to determine that the compared data is indicative of a deletion operation. Keyboard module 8 may compare the threshold distance to the distance retraced by the user along portion of the path for the last character entered. For example, the threshold distance may be compared with the distance along the portion of the path from the points indicating a change in direction where the user began retracing the gesture and traversed keyboard 15 back to the edge of the key entered before the incorrectly entered character. In the example of FIG. 4, the user enters the characters "l-i-f" in order and realizes that character "f" is incorrect. The threshold for deleting the character "f" in this example is the distance from the key "f," approximately where the direction substantially reverses, to at least the edge of key "i" proximate to key "u." Responsive to determining that the retraced portion of the path, or second path, meets the threshold, keyboard module 8 determines that the gesture is a deletion operation based on the change in direction at key "f" and the second path 94 substantially retracing back to key "i." Responsive to determining that the retracing indicates a deletion operation, computing device 2 removes the character "f" from text editor field 18.

When the retraced portion of the path does not meet the threshold, keyboard module 8 may determine that the gesture may indicate subsequent character entry. For example, the retraced portion may not retrace far enough to meet the threshold, such as not retracing second path 94 back to the key "i." Instead, in this example, second path 94 may be retraced back to key "u." The retraced portion fails to meet the threshold requiring retracing back to key "i." Computing device 2 may determine that the retracing indicates deleting the character "f," due to the change in direction and the retracing in the direction of the path. However, computing device 2 may determine that the user entered character "u," because the gesture path was not retraced back a sufficient distance to key "i." Upon this determination, computing device 2 will responsively cause text editor field 18 to display the letter "u" at the end of the characters "l-i-u."

In another example, if the retrace gesture extends well beyond the threshold distance for deleting a particular character, i.e., beyond a second threshold distance, then computing device 2 may determine that the gesture indicates entering a character in addition to deleting the previous character(s). For example, if the user retraces "f-i" for deleting the letter "f" but retraces too far extending the retrace to key "o." Computing device 2 may determine that characters "f-i" are deleted, and responsively removes "f-i" from text editor field 18. Additionally, computing device 2 determines that the gesture indicates entering the letter "o."

Figure 5:
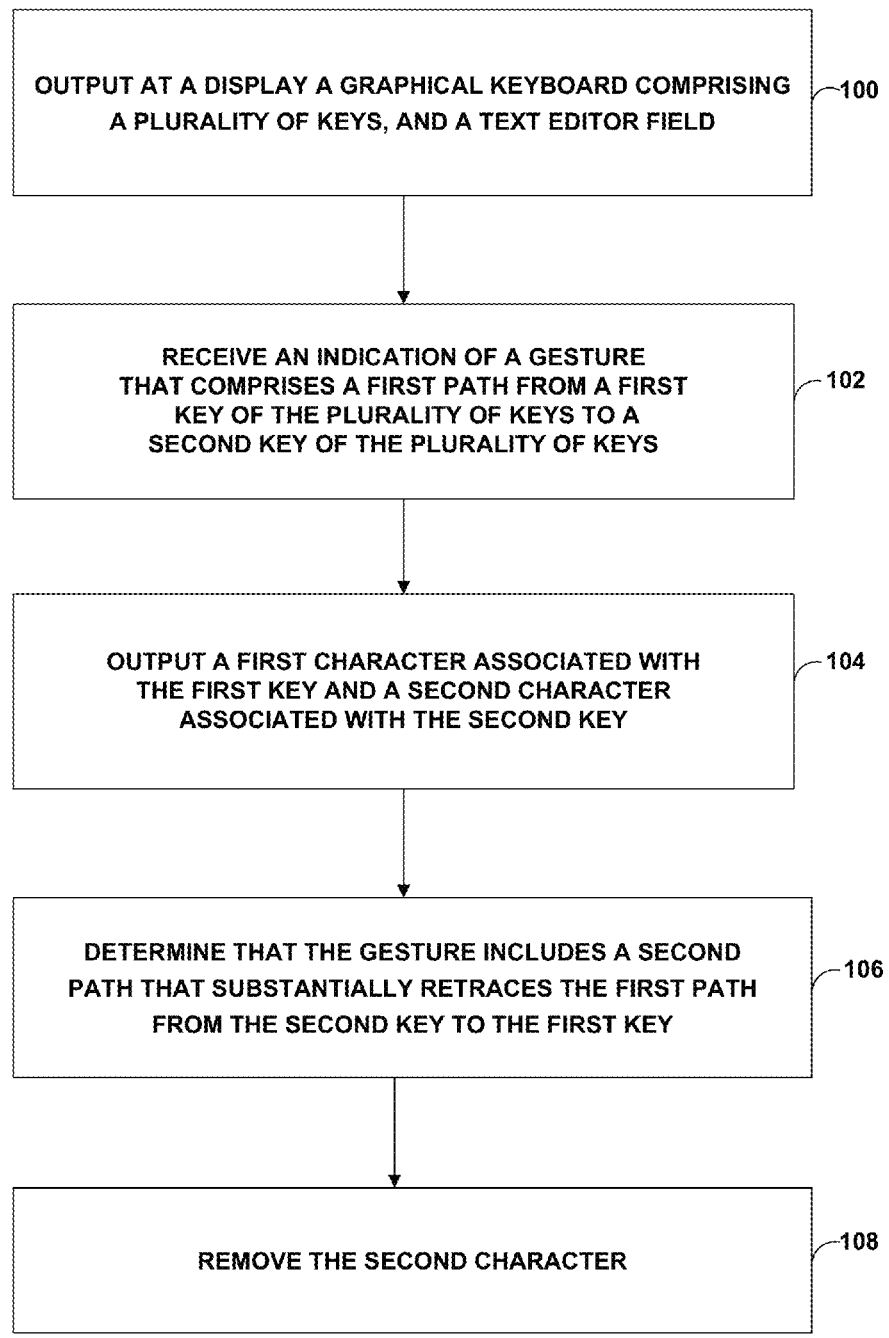
FIG. 5 is a flow diagram illustrating example operations of a computing device to delete characters according to a deletion operation, in accordance with one or more techniques of the present disclosure.

FIG. 5 is a flow diagram illustrating example operations of a computing device to delete characters according to a deletion operation during a current gesture, in accordance with one or more techniques of the present disclosure. For purposes of illustration only, the example operations are described below within the context of computing device 2, as shown in FIG. 1.

In the example of FIG. 5, computing device 2 may initially output a graphical user interface, for display at a presence-sensitive display operatively coupled to computing device 2, which may include a graphical keyboard comprising a plurality of keys and a text editor field (100). Computing device 2 may receive an indication of a gesture detected at the presence-sensitive display that may include a first path from a first key of the plurality of keys to a second key of the plurality of keys (102). In response to receiving the indication, computing device 2 may output, for display at the text editor field of the presence-sensitive display, a first character associated with the first key and a second character associated with the second key (104). Computing device 2 may determine that the gesture further comprises a second path that retraces at least a portion of the first path from the second key to the first key (106). In response to determining that the gesture further comprises the second path that retraces at least a portion of the first path back to the first key, computing device 2 may remove from the text editor field of the graphical user interface, the second character (108).

In one example, the operations may include determining a shape of the first path, and based on the determined shape of the first path, outputting, for display at the text editor field the first character associated with the first key and determined shape of the first path. In another example, the operations may include determining, by the computing device, a shape of the second path, and based on the determined shape of the second path, removing, from the text editor field of the presence-sensitive display, the second character. In one example, the operations may include identifying the shape of the second path as a substantially sinusoidal shape, and based on the identified substantially sinusoidal shape, removing, from the text editor field, the second character.

In another example, the operations may include determining, by the computing device, a position of the computing device, and based on the determined position of the computing device and the shape of the second path, removing, from the text editor field of the presence-sensitive display, the second character. In one example, the first path is traced by a first object and the second path is traced by a second, different object. In another example, the operations include determining, by the computing device, a speed of the gesture that comprises the second path, and when the speed is above a threshold speed, removing, from the text editor field of the presence-sensitive display and by the computing device, the second character.

In one example, the operations may include removing, from the text editor field of the presence-sensitive display and by the computing device, the second character when no gesture movement is detected, by the computing device, between the gesture of the first path and the gesture of the second path for at least a period of time. In another example, the operations may include detecting, by the computing device at the presence-sensitive display, the gesture of the first path and the gesture of the second path are detected within a predetermined period of time.

In one example, the operations may include, in response to determining, by the computing device, that the second path retraces a portion of the first path associated with more than one determined character, removing, from the text editor field of the presence-sensitive display and by the computing device, the more than one determined character associated with retraced portion. In another example, the operations may include, in response to determining, by the computing device, that the gesture further comprises a second path that retraces at least a portion of the first path from the second key to a third key between the first key and the second key, removing, from the text editor field of the presence-sensitive display and by the computing device, the second character, and displaying, at the text editor field of the presence-sensitive display, a third character associated with the third key.

In one example, the operations may include determining, by the computing device, if the second path retraces a threshold portion of the first path. In another example, the operations may include, when the computing device determines that the second path retraces at least the threshold portion of the first path, removing, from the text editor field of the presence-sensitive display and by the computing device, the second character. In one example, the operations may include, when the computing device determines that the second path retraces less than the at least the threshold portion of the first path, refraining from removing, from the text editor field of the presence-sensitive display, the second character.

In another example, the operations may include comparing with a language module, and when there is no match, removing character. In one example, the operations may include outputting, at the presence-sensitive display and based on the detected gesture, a graphical representation of the first and second paths. In another example, the operations may include removing the portion of the outputted indication representing the second path that retraces at least a portion of the first path from the second path. In one example, the operations may include removing, from the text editor field of the presence-sensitive display and by the computing device, the second character, is further in response to detecting a substantial change in direction of the second path relative to the first path.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily simply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:
1. A method comprising:
outputting, by a computing device and for display at a presence-sensitive display,
a graphical keyboard comprising a plurality of keys and a text editor field;
responsive to receiving an indication of a continuous gesture detected at the presence-sensitive display that comprises a first path in a first direction from a first key to a second key, outputting, for display at the text editor field of the presence-sensitive display and based at least in part on the continuous gesture, a first character associated with the first key and a second character associated with the second key;
determining, by the computing device, that a second path of the continuous gesture from the second key towards the first key retraces at least a portion of the first path from the first key to the second key, wherein the second path is in a second direction that is substantially reverse to the first direction; and
responsive to determining that the second path retraces at least the portion of the first path in the second direction that is substantially reverse to the first direction and that the continuous gesture further comprises a third path to a third key, the third key associated with a third character:
removing, by the computing device and from display at the presence-sensitive display, the second character, and
outputting, by the computing device and for display, the third character in a character string comprising the third character subsequent to first character and without the second character included between the first character and third character.

2. The method of claim 1, further comprising:
determining a shape of the first path, and
based on the determined shape of the first path, outputting, for display at the text editor field, the first character associated with the first key and a graphical representation of the determined shape of the first path.

3. The method of claim 1, further comprising:
determining, by the computing device, a shape of the second path, and
wherein removing the second character is based on the determined shape of the second path.

4. The method of claim 3, further comprising:
identifying the shape of the second path as a substantially sinusoidal shape, and
wherein removing the second character is based on the identified substantially sinusoidal shape.

5. The method of claim 3, further comprising:
determining, by the computing device, a position of the computing device when the second path retraced the portion of the first path, and
wherein removing the second character is based on the determined position of the computing device and the shape of the second path.

6. The method of claim 1, wherein the first path is traced by a first object and the second path is traced by a second, different object.

7. The method of claim 1, further comprising:
determining, by the computing device, a speed at which the second path was traversed by the continuous gesture; and
wherein removing the second character is based on the speed being above a threshold speed.

8. The method of claim 1, wherein the second character is removed when no movement is detected, by the computing device, between the motion of the first path and the motion of the second path for at least a period of time.

9. The method of claim 1, further comprising:
responsive to determining that the continuous gesture comprises the second path that retraces the portion of the first path, determining, by the computing device at the presence-sensitive display, that the first path and the second path are detected within a period of time; and
wherein removing the second character is based on the period of time being less than a threshold.

10. The method of claim 1, further comprising:
responsive to determining, by the computing device, that the second path retraces the portion of the first path that is associated with a plurality of characters, removing, from the text editor field of the presence-sensitive display and by the computing device, the plurality of characters associated with retraced portion.

11. The method of claim 1, further comprising:
determining, by the computing device, whether the second path retraces a threshold portion of the first path, wherein the threshold portion has a threshold distance; and
wherein removing the second character is based on the second path retracing the threshold distance of the threshold portion of the first path; and
when the computing device determines that the second path retraces less than the threshold distance of the threshold portion of the first path, refraining from removing, from the text editor field of the presence-sensitive display, the second character.

12. The method of claim 1, further comprising:
comparing at least the first character and the second character to a language module; and
wherein removing the second character is based on determining that the gesture comprises a second path that retraces at least a portion of the first path and no result from comparison of the language module being above a threshold probability.

13. The method of claim 1, further comprising:
outputting, at the presence-sensitive display and based on the detected gesture, a graphical representation of the first and second paths; and
removing a portion of the graphical representation that represents the second path that retraces the portion of the first path.

14. The method of claim 1, wherein removing, from the text editor field of the presence-sensitive display and by the computing device, the second character, is further in response to detecting a substantial change in direction of the second path relative to the first path.

15. A computing device comprising:
a processor; and
at least one module operable by the processor to:
output, for display at a presence-sensitive display, a graphical keyboard comprising a plurality of keys and a text editor field,
responsive to receiving an indication of a continuous gesture detected at the presence-sensitive display that comprises a first path in a first direction from a first key to a second key, output, for display at the text editor field of the presence-sensitive display and based at least in part on the continuous gesture, a first character associated with the first key and a second character associated with the second key,
determine that a second path of the continuous gesture from the second key towards the first key retraces at least a portion of the first path from the first key to the second key, wherein the second path is in a second direction that is substantially reverse to the first direction; and
responsive to determining that the second path retraces at least the portion of the first path in the second direction that is substantially reverse to the first direction and that the continuous gesture further comprises a third path to a third key, the third key associated with a third character:
remove, from display, the second character at the presence-sensitive display, and
output, for display, the third character in a character string comprising the third character subsequent to the first character and without the second character included between the first character and third character.

16. The computing device of claim 15, wherein the at least one module determines a shape of the second path and, wherein removing the second character is based on the determined shape of the second path.

17. The computing device of claim 15, wherein the at least one module determines an orientation of the computing device when the second path retraced at least a portion of the first path and, wherein removing the second character is based on the determined orientation.

18. The computing device of claim 15, wherein the at least one module determines a speed at which the second path was traversed by the continuous gesture and, wherein removing the second character is based on the speed being above a threshold speed.

19. A non-transitory computer-readable storage medium encoded with instructions that, when executed, cause at least one processor of a computing device to perform operations comprising:

outputting, by a computing device and for display at a presence-sensitive display a graphical keyboard comprising a plurality of keys and a text editor field;

responsive to receiving an indication of a continuous gesture detected at the presence-sensitive display that comprises a first path in a first direction from a first key to a second key, outputting, for display at the text editor field of the presence-sensitive display and based at least in part on the continuous gesture, a first character associated with the first key and a second character associated with the second key; and determine that a second path of the continuous gesture from the second key towards the first key retraces at least a portion of the first path from the first key to the second key, wherein the second path is in a second direction that is substantially reverse to the first direction; and responsive to determining that the second path retraces at least the portion of the first path in the second direction that is substantially reverse to the first direction and that the continuous gesture further comprises a third path to a third key, the third key associated with a third character:

remove, from display at the presence-sensitive display, the second character, and output for display, the third character in a character string comprising the third character subsequent to first character and without the second character included between the first character and third character.

* * * * *